US010565122B2

(12) United States Patent
Lai et al.

(10) Patent No.: US 10,565,122 B2
(45) Date of Patent: Feb. 18, 2020

(54) SERIAL TAG LOOKUP WITH WAY-PREDICTION

(71) Applicant: Microsoft Technology Licensing, LLC, Redmond, WA (US)

(72) Inventors: Patrick P. Lai, Fremont, CA (US); Robert Allen Shearer, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/607,964

(22) Filed: May 30, 2017

(65) Prior Publication Data

US 2018/0349284 A1 Dec. 6, 2018

(51) Int. Cl.
*G06F 12/08* (2016.01)
*G06F 12/0895* (2016.01)

(52) U.S. Cl.
CPC .. *G06F 12/0895* (2013.01); *G06F 2212/1016* (2013.01); *G06F 2212/6032* (2013.04); *G06F 2212/6082* (2013.01)

(58) Field of Classification Search
CPC ......................... G06F 12/0811; G06F 12/0815
See application file for complete search history.

(56) References Cited

U.S. PATENT DOCUMENTS 5,276,849 A 1/1994 Patel
5,418,922 A 5/1995 Liu
5,963,978 A 10/1999 Feiste
6,115,792 A 9/2000 Tran
6,275,909 B1 8/2001 Arimilli et al.
6,629,206 B1 * 9/2003 Johnson .............. G06F 12/0864 711/123
6,687,789 B1 2/2004 Keller et al.
6,826,656 B2 11/2004 Augsburg et al.
7,143,243 B2 11/2006 Miller
7,937,535 B2 5/2011 Ozer et al.
9,396,117 B2 7/2016 Aggarwal et al.
2002/0083268 A1 6/2002 Arimilli et al.
2005/0050278 A1 3/2005 Meier et al.
(Continued)

FOREIGN PATENT DOCUMENTS

KR 20080067108 A 7/2008

OTHER PUBLICATIONS

Calder, et al., "Predictive Sequential Associative Cache", In Proceedings of Second International Symposium on High-Performance Computer Architecture, Feb. 3, 1996, 10 pages.
(Continued)

*Primary Examiner* — Ryan Bertram
*Assistant Examiner* — Trang K Ta
(74) *Attorney, Agent, or Firm* — Alleman Hall Creasman & Tuttle LLP

(57) ABSTRACT

The lookup of accesses (including snoops) to cache tag ways is serialized to perform one (or less than all) tag way access per clock (or even slower). Thus, for a N-way set associative cache, instead of performing lookup/comparison on the N tag ways in parallel, the lookups are performed one tag way a time. Way prediction is utilized to select an order to look in the N ways. This can include selecting which tag way will be looked in first. This helps to reduce the average number of cycles and lookups required.

23 Claims, 11 Drawing Sheets

(56) References Cited

U.S. PATENT DOCUMENTS

| | | | | |
|---|---|---|---|---|
| 2009/0024799 | A1 | 1/2009 | Jahagirdar et al. | |
| 2009/0031082 | A1 | 1/2009 | Ford et al. | |
| 2014/0115264 | A1* | 4/2014 | Shirahige | G06F 12/0895 711/137 |
| 2015/0046658 | A1 | 2/2015 | Wilson | |
| 2015/0186284 | A1* | 7/2015 | Butler | G06F 12/0864 711/128 |
| 2018/0137054 | A1 | 5/2018 | Lai et al. | |

OTHER PUBLICATIONS

"Non Final Office Action Issued in U.S. Appl. No. 15/349,203", dated Aug. 28, 2018, 16 Pages.

Bournoutian, et al., "Dynamic, Multi-Core Cache Coherence Architecture for Power-Sensitive Mobile Processors", In Proceedings of the 9th International Conference on Hardware/Software Codesign and System Synthesis, Oct. 9, 2011, pp. 89-97.

Moshovos, et al., "JETTY: Filtering Snoops for Reduced Energy Consumption in SMP Servers", In Proceedings of the HPCA 7th International Symposium on High-Performance Computer Architecture, Jan. 19, 2001, 12 Pages.

Reinman, et al., "Using A Serial Cache For Energy Efficient Instruction Fetching", In Journal of Systems Architecture, vol. 50, Issue 11, Nov. 1, 2004, pp. 1-21.

Saldanha, et al., "Power Efficient Cache Coherence", Retrieved From: https://web.archive.org/web/20140609053020/http://pharm.ece.wisc.edu/papers/saldanha_30pages.pdf, Retrieved On: Jun. 9, 2014, pp. 1-30.

Shafiee, et al., "Helia: Heterogeneous Interconnect For Low Resolution Cache Access In Snoop-Based Chip Multiprocessors", In Proceedings of IEEE International Conference on Computer Design, Oct. 3, 2010, pp. 84-91.

Zhang, et al., "Reducing Dynamic Energy Of Set-Associative L1 Instruction Cache By Early Tag Lookup", In Proceedings of IEEE/ACM International Symposium on Low Power Electronics and Design, Jul. 22, 2015, 6 Pages.

* cited by examiner

SERIAL TAG LOOKUP WITH WAY-PREDICTION

BACKGROUND

Devices Integrated circuits, and systems-on-a-chip (SoC) may include multiple independent processing units (a.k.a., “cores”) that read and execute instructions. These multi-core processing chips typically cooperate to implement multiprocessing. To facilitate this cooperation and to improve performance, multiple levels of cache memories may be used to help bridge the gap between the speed of these processors and main memory.

SUMMARY

Examples discussed herein relate to an apparatus for processing data that includes an N-way set associative cache memory, a cache controller, and a way predictor. The N-way set associative cache memory includes a storage array and N tag ways. The storage array is organized into a plurality of data blocks (e.g., cache lines.) The tag ways provide an N-way index of storage array locations associated with data blocks stored in the storage array. The cache controller is coupled to the cache memory to respond to cache access requests for data blocks. The cache controller is configurable to perform cache lookups using N-ways in parallel. The cache controller is also configurable to perform cache lookups on the N-ways by serially using sets of M ways in parallel, where M<N. While the cache controller is configured to perform cache lookups serially, the way predictor selects a respective set of M ways as the initial M ways to be looked up based at least in part on a cache access request.

In another example, a method of operating a cache memory system that has a plurality of ways includes configuring the cache memory system to perform tag lookups on all of the plurality of ways concurrently. The method also includes configuring the cache memory system to serially perform tag lookups concurrently on subsets of the plurality of cache ways. The method also includes selecting, based on a history of tag lookups and based on an address of a cache access request, initial subsets of the plurality of cache ways to be looked up.

In another example, a method of operating an N-way set associative cache memory system having N tag ways includes, based on the cache memory system being in a first operating mode, looking up data blocks in the N tag ways concurrently. The method also includes, based on the cache memory system being in a second operating mode, sequentially looking up data blocks in subsets of the N tag ways using M tag ways at a time, where M<N. An initial set of the M tag ways to be sequentially looked up first is selected based on a way prediction table.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

DETAILED DESCRIPTION OF THE EMBODIMENTS

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a computing device, or an integrated circuit.

When it is desired for a system with a cache to conserve dynamic power, the lookup of accesses (including snoops) to cache tag ways is serialized to perform one (or less than all) tag way access per clock (or even slower). Thus, for a N-way set associative cache, instead of performing lookup/comparison on the N tag ways in parallel, the lookups are performed one tag way a time. This can take up to N times more cycles thereby reducing the access/snoop bandwidth by a factor of N. However, by utilizing way prediction to select an order to look in the N ways (including selecting which tag way will be look in first), the average increase in cycles can be reduced. This helps to reduce the power consumption of the serialized accesses when compared to ‘all parallel’ accesses/snoops and/or when compared to a fixed order to search the tag ways.

As used herein, the term “processor” includes digital logic that executes operational instructions to perform a sequence of tasks. The instructions can be stored in firmware or software, and can represent anywhere from a very limited to a very general instruction set. A processor can be one of several “cores” (a.k.a., ‘core processors’) that are collocated on a common die or integrated circuit (IC) with other processors. In a multiple processor (“multi-processor”) system, individual processors can be the same as or different than other processors, with potentially different performance characteristics (e.g., operating speed, heat dissipation, cache sizes, pin assignments, functional capabilities, and so forth). A set of “asymmetric” or “heterogeneous” processors refers to a set of two or more processors, where at least two processors in the set have different performance capabilities (or benchmark data). A set of “symmetric” or “homogeneous” processors refers to a set of two or more processors, where all of the processors in the set have the same performance capabilities (or benchmark data). As used in the claims below, and in the other parts of this disclosure, the terms "processor", "processor core", and "core processor", or simply "core" will generally be used interchangeably.

Figure 1:
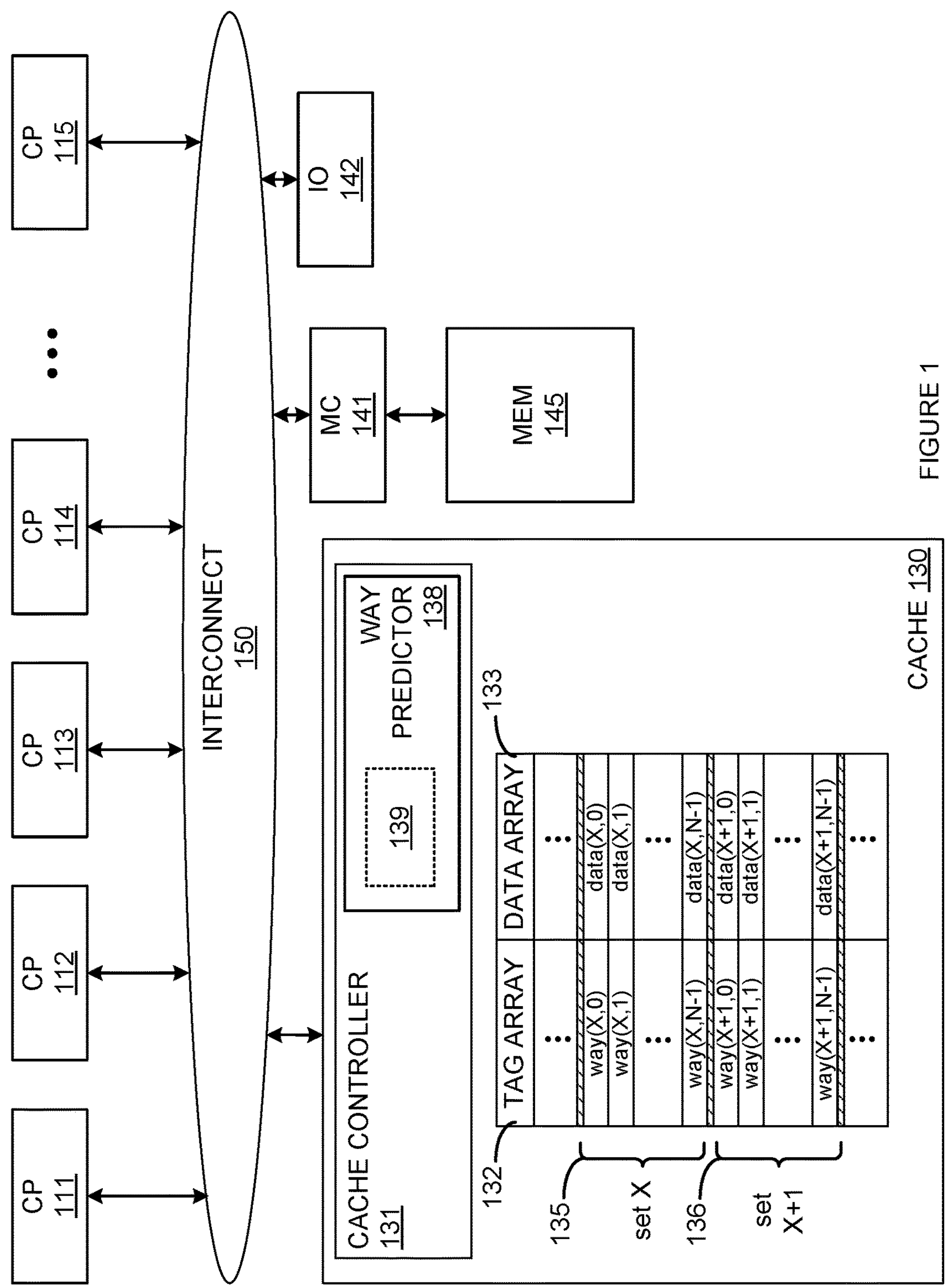
FIG. 1 is a block diagram of a processing system that includes a configurable way predicting a cache controller and an N-way set associative cache memory.

FIG. 1 is a block diagram of a processing system that includes a configurable way predicting a cache controller and an N-way set associative cache memory. In FIG. 1, processing system 100 includes core processor (CP) 111, core processor 112, core processor 113, core processor 114, core processor 115, cache 130, interconnect 150, memory controller 141, input/output (IO) processor 142, and main memory 145. Processing system 100 may include additional processors, interfaces, caches, and IO processors (not shown in FIG. 1.)

Core processor 111 is operatively coupled to interconnect 150. Core processor 112 is operatively coupled to interconnect 150. Core processor 113 is operatively coupled to interconnect 150. Core processor 114 is operatively coupled interconnect 150. Core processor 115 is operatively coupled to interconnect 150. Memory controller 141 is operatively coupled to interconnect 150 and to main memory 145. IO processor 142 is operatively coupled to interconnect 150.

Thus, for the example embodiment illustrated in FIG. 1, it should be understood that the elements of processing system 100 are arranged in 'crossbar' interconnect topology. Other network topologies (e.g., mesh, ring, star, hybrid(s), etc.) may be employed by processing system 100.

Interconnect 150 operatively couples processors 111-115, memory controller 141, and IO processor 142 to each other and to cache 130. Thus, data access operations (e.g., load, stores) and cache operations (e.g., snoops, evictions, flushes, etc.), by a processor 111-115, cache 130, memory controller 141, and/or IO processor 142 may be exchanged with each other via interconnect 150.

Cache 130 includes cache controller 131, tag array 132, and data (i.e., cache line) array 133. Tag array 132 and data array 133 are organized into congruence classes (i.e., 'cache ways' or 'ways') In FIG. 1, tag array 132 is organized into N number of ways per congruence classes. This is illustrated in FIG. 1 by set X 135 and Set X+1 136 each of which are illustrated with N ways with each way corresponding to a data block (i.e., cache line.) Thus, it should be understood that tag array 132 provides an N-way index of data (storage) array locations that are associated with data blocks (cache lines) stored in the data array. Cache controller 131 includes way predictor 138. Way predictor 138 may include a way prediction table 139.

When an access request (e.g., read, write, snoop, invalidate, etc.), is received, cache controller 131 compares a tag field of the access address to tag values currently stored in a corresponding tag way of the tag array. If a tag match exists, and the tag is valid (i.e., a cache hit), then the cache responds to the access request. The results of these tag matches (and/or misses) can be used to update way prediction table 139.

In a first settable configuration, when an address for an access is received by cache 130, cache controller 131 activates and reads, in parallel, all the entries of a tag set 135-136 in the tag array 132 that corresponds to the cache lines that potentially match the address. In other words, all the ways in the addressed tag set 135-136 are activated, read, and at least part of their contents compared to the access address in parallel (i.e., concurrently). In an embodiment, all the addresses in the data array that correspond to the addressed tag set 135-136 are also read in parallel.

In a second settable configuration, when an address for an access is received by cache 130, cache controller 131 activates, reads, and compares the contents of (i.e., looks-up or examines) only a single entry of the addressed tag set 135-136 in the tag array 132 at a time. The order that these entries are examined is determined by way predictor 138 based on way prediction table 139. In other words, a first way in the addressed tag set 135-136 is selected by way predictor 138 based on one or more of the access address, the requestor (e.g., CP 111-115, IO 142, etc.), and hit history information stored in way prediction table 139. This first way is then activated, read, and compared to the access address. If this first activated tag entry did not result in a 'hit,' a second way (as selected by way predictor 138) in the addressed tag set 135-136 is then activated, read, and compared. Based on the determination that the first activated tag entry did or did not result in a 'hit,' cache controller and/or way predictor 138 may update information in way prediction table 139. If this second activated tag entry did not result in a 'hit,' a third way (as selected by way predictor 138) in the addressed tag set 135-136 is then activated, read, and compared, and so on. Based on these determinations of whether a particular activated tag entry did or did not result in a 'hit,' cache controller and/or way predictor 138 may update information in way prediction table 139. This serial accessing of a single way at a time may be continued until one of the tag entries results in a hit, or all of the (valid) entries in the set have been accessed (i.e., a 'miss') In an embodiment, each of the addresses in the data array that correspond to the tag entry being activated are also activated.

In an embodiment, in the second settable configuration, when an address for an access is received by cache 130, cache controller 131 activates, reads, and compares the contents of M number of entries of the addressed tag set 135-136 in the tag array 132 in parallel. The selection of which entries belong to successive sets of M entries, and the order the sets are examined is determined by way predictor 138 based on way prediction table 139. In other words, a first set of M ways in the addressed tag set 135-136 is selected by way predictor 138 based on one or more of the access address, the requestor (e.g., CP 111-115, IO 142, etc.), and hit history information stored in way prediction table 139. This first M number of ways (where M is less than the total number of ways) in the addressed tag set 135-136 are then activated, read, and each compared, in parallel, to the access address. If this first set of activated tag entries does not result in a 'hit,' a second set of M ways (as selected by way predictor 138) in the addressed tag set 135-136 are then activated, read, and each compared, in parallel, to the access address. If this second set of activated tag entries does not result in a 'hit,' a third set of M ways (as selected by way predictor 138) in the addressed tag set 135-136 are then activated, read, and compared, in parallel, and so on. This serial accessing of the M ways at a time may be continued until one of the tag entries results in a hit, or all of the (valid) entries in the set have been accessed (i.e., a 'miss') In an embodiment, each of the addresses in the data array that correspond to the M number of tag entries being activated are also activated. It should also be understood that when M=1 (i.e., a subset of one), it is equivalent to accessing each tag way of a set 135-136 one at a time.

In an embodiment, way predictor 138 may vary, from access to access or from set to set, the order that the tag entries within a set are accessed. For example, rather than, for a given access address, access way #0 first, way #1 second, way #2 third, etc., way predictor 138 may regularly, based on the information in way prediction table 139, change the order the serialized tag accesses take place. By changing the order of the serialized accesses based on historical 'hit' information in way prediction table 139, the average number of accesses before a 'hit' is found in a way can be reduced. This can save on power consumption.

In an embodiment, the order of the serialized tag accesses may depend on the type of access request. For example, access requests to a particular access address that are also associated with processor 111-115 may cause way predictor 138 to select a first tag/way lookup order (e.g., way #0, then way #1, then way #2, etc.). For access requests to that same access address that are associated with I/O 142 may cause way predictor 138 to select, a second, different from the first, order (e.g., way # N−1, then way # N−2, then way N−3, etc.)

In an embodiment, whether the tag ways are accessed in parallel versus serially in subsets may be based on the type of access request. For example, for access requests associated with processor 111-115 accesses, all of the tag ways may be accessed in parallel (i.e., the first settable configuration). For access requests associated with I/O 142 accesses, the tag ways may be accessed serially in subsets of M entries at a time, where M≥1.

In an embodiment, cache memory 130 can be configured to perform tag lookups on all of the plurality of ways of a tag set 135-136 concurrently. Cache memory system 130 can also be configured to serially perform, in a first order, tag lookups concurrently on subsets of the plurality of cache ways. These subsets may consist of one cache way of the tag sets 135-136. These subsets may consist of multiple (but less than all) ways of the tag sets 135-136. This first order that the tag lookups are performed may be selected by way predictor 138 based on the access address and/or information stored in way prediction table 139.

In an embodiment, cache memory 130 may stop performing tag lookups on the current tag set 135-136 when a respective tag lookup indicates a corresponding data block is in cache memory 130. In another embodiment, the serially performed tag lookups may proceed until a tag lookup has been performed on all of the plurality of ways—regardless of whether an earlier lookup produced a hit. In either case, the information in tag prediction table 139 may be updated based on whether, or which, tag ways resulted (or did not result) in a tag hit.

Cache memory 130 can also be configured to serially perform, in a second order, tag lookups concurrently on the subsets of the plurality of cache ways where the second order is different from the first order. This second order that the tag lookups are performed may be selected by way predictor 138 based on the access address and/or information stored in way prediction table 139.

Cache memory 130 may associate one of a plurality of memory types with cache access requests. For example, using an access type or the address of the access, cache memory 130 may associate a cache access with processor memory or memory mapped I/O space. Cache memory 130 may be configured to perform tag lookups on all of the plurality of ways of a set 135-136 concurrently based on a first cache access request being associated with a first memory type (e.g., processor memory). Cache memory 130 may also be configured to serially perform tag lookups concurrently on subsets of the plurality of cache ways of a set 135-136 based on a second cache access request being associated with a second memory type (e.g., memory mapped I/O space.) The order that the subsets are used to serially perform tag lookups may be selected by way predictor 138 based on the access address, access type, and/or information stored in way prediction table 139.

In an embodiment, the number of ways in the subsets that are concurrently looked-up is based on a power state of cache memory 130. For example, when processing system 100 (and/or cache 130) is in a high-power state, cache memory 130 may activate and read, in parallel, all the entries of a tag set 135-136 for every cache access. When processing system 100 (and/or cache 130) is in a balanced power state, processor 111-115 accesses (e.g., snoops) may access the ways of a set 135-136 in parallel, while I/O accesses (e.g., I/O coherence snoops) may access the ways of a set 135-136 one subset at a time. Other combinations of parallel, subset, or single entry accesses to the ways of a set 135-136 may also be used, for example, to balance power and performance. When processing system 100 (and/or cache 130) is in a low power state, both processor 111-115 accesses (e.g., snoops) and I/O accesses (e.g., I/O coherence snoops) may access the ways of a set 135-136 one subset at a time.

In an embodiment, a power state of the cache memory 130 determines whether the cache memory 130 is to be configured to perform tag lookups on all of the ways of a set 135-136 concurrently, and also determines whether the cache memory 130 is to be configured to serially perform tag lookups concurrently on subsets of the cache ways of a set 135-136. For example, when cache memory 130 is in a first operating mode (e.g., a high-power, high performance mode), data blocks in all N of the tag ways are looked up concurrently. When cache memory 130 is in a second operating mode (e.g., a low-power, low-performance mode), data blocks in subsets of M of the N tag ways (I.e., using M tag ways at a time), where M<N, are sequentially looked up. It should be understood that M=1, M>1, M>2, etc.

For example, the first operating mode may be associated with cache 130 accesses by a compute processor 111-115 and the second operating mode may be associated with cache accesses by an input/output processor 142. In another example, the first operating mode may be associated with a first power state (e.g., a high-power state) of the cache memory 130 and the second operating mode may be associated with a second power state (e.g., a low-power state) of the cache memory system. In addition, during (or in response to) the second power state, the sequential order that sets of the M tag ways are used to look up data blocks is selected by way predictor 138 based on the access address and/or information stored in way prediction table 139.

Thus, it should be understood that to access cache 130, which is an N-way set associative cache, there are N number of tag accesses and comparisons to perform (e.g., for a snoop access). These lookups are configurable to be performed in either a serial manner (e.g., 1 access and comparison per clock or tag way access cycle) in order to save power, or a parallel manner. These lookups can be configured to be performed serially for non-latency sensitive accesses like snoop accesses for I/O coherent transactions. The that these tag lookups are performed may be selected by way predictor 138 based on the access address and information stored in way prediction table 139. These lookups can also be configured to be performed in parallel for latency sensitive accesses like processor snoops. Other mixes of serial and parallel accesses may also be configured in order to dynamically balance access (e.g., snoop) bandwidth and latency versus power.

FIGS. 2A-2E are diagrams that illustrate way predicted and concurrent accesses to a plurality of cache tag ways. In FIGS. 2A-2E cache 230 comprises cache controller 231 and tag array 232. Cache controller 231 include way predictor 238. Way predictor 238 include way prediction table 239. Tag array 232 is organized into at least one associative set X 235. In FIGS. 2A-2F, associative set X is illustrated with four (4) ways—way0, way1, way2, and way3.

Figure 2A:
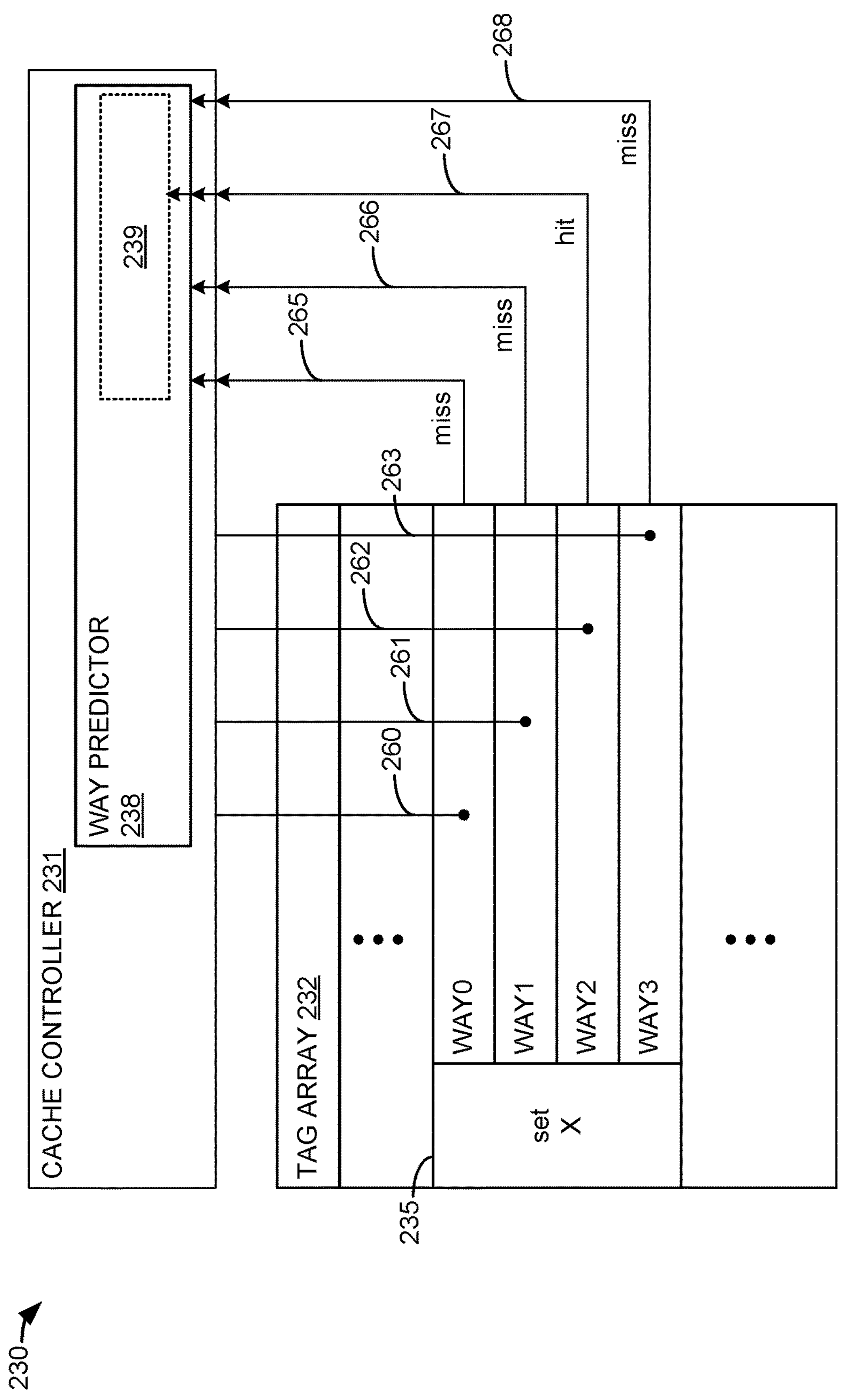
FIGS. 2A-2E are diagrams that illustrate way predicted and concurrent accesses to a plurality of cache tag ways.

FIG. 2A illustrates a parallel access to all of the ways of set X. In FIG. 2A, cache controller 231 activates and reads all the ways of set X in parallel. This is illustrated in FIG. 2A by lines 260-263. Since all the ways of a set are read in parallel, the order that they are read is not subject to selection by way predictor 238. The results of the parallel access to all the ways of set X are provided to cache controller 231. This is illustrated in FIG. 2A by arrows 265-268. Also illustrated in FIG. 2A is that the way2 entry of set X resulted in a 'hit' and the other ways in set X were 'misses.' This is illustrated in FIG. 2A by the 'hit' label on arrow 267 (which runs from way2 to cache controller 231) and the 'miss' labels on arrows 265, 266, and 268 (which run from way0, way1, and way3, respectively, to cache controller 231.) At least the information regarding the 'hit' from way2 is provided to way predictor 238. Way predictor 238 may use this information to update way prediction table 239. Thus, even though cache controller 231 is performing 'parallel' tag lookups, the 'hit' and/or 'miss' information that results from those lookups can be used to improve the predictions made by way predictor 238.

Figure 2B:
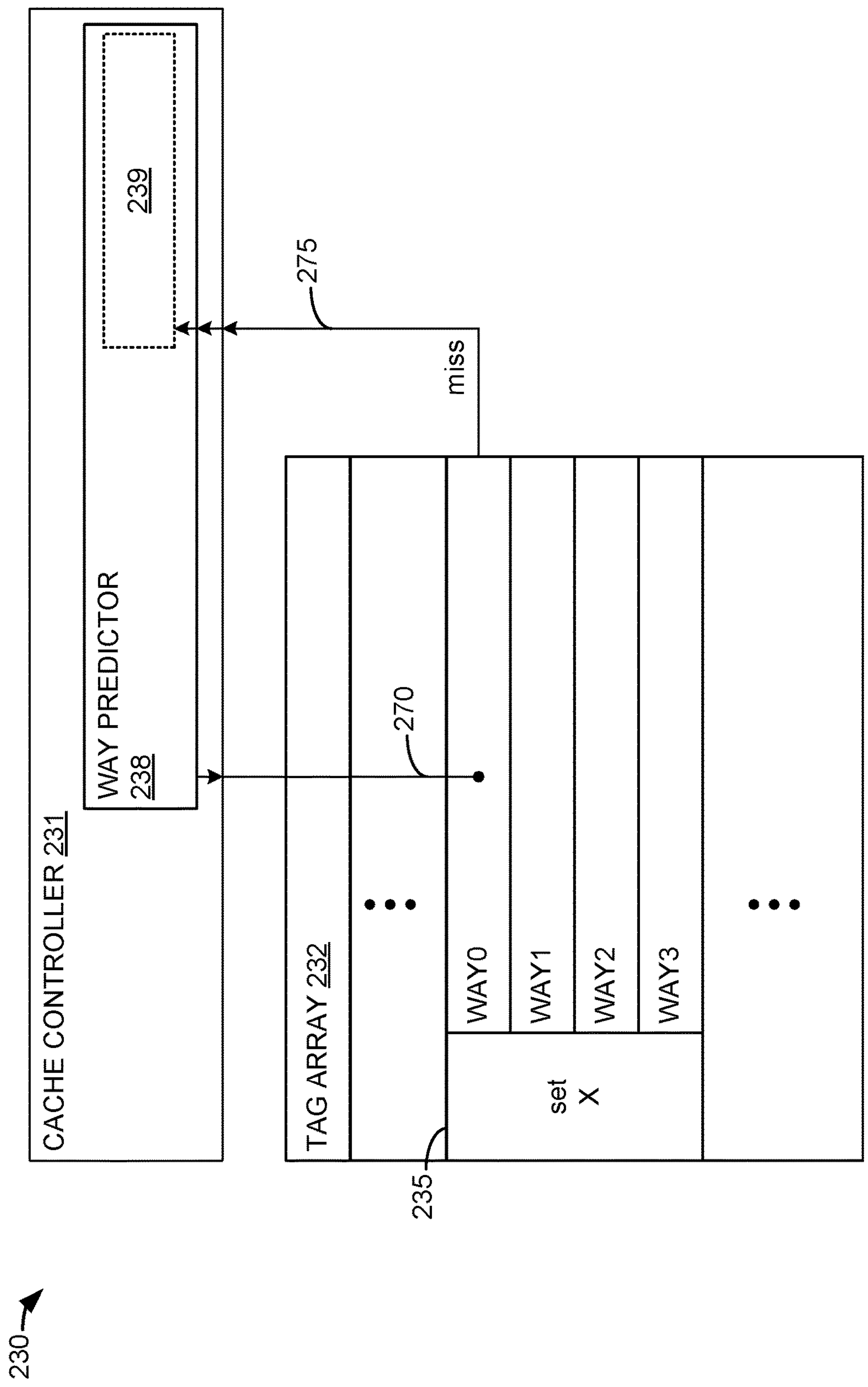

FIG. 2B illustrates a first serialized access to a first way of set X. In FIG. 2B, way predictor 238 selects, and cache controller 231 activates and reads, only a single way of set X. This is illustrated in FIG. 2B by line 270 from way predictor 238 to way0. The results of this first access to the first way of set X is provided to cache controller 231 and way predictor 238 (and way prediction table 239, in particular.) This is illustrated in FIG. 2B by arrow 275 from way0 to way prediction table 239. Also illustrated in FIG. 2B is that the access to the way0 entry of set X resulted in a 'miss.' This is illustrated in FIG. 2B by the 'miss' label on arrow 275 (which runs from way0 to cache controller 231 and way prediction table 239.) Thus, the determination that the order selected by way predictor 238 resulted in a 'miss' on the first tag selected for lookup can be used to improve the predictions made by way predictor 238.

Figure 2C:
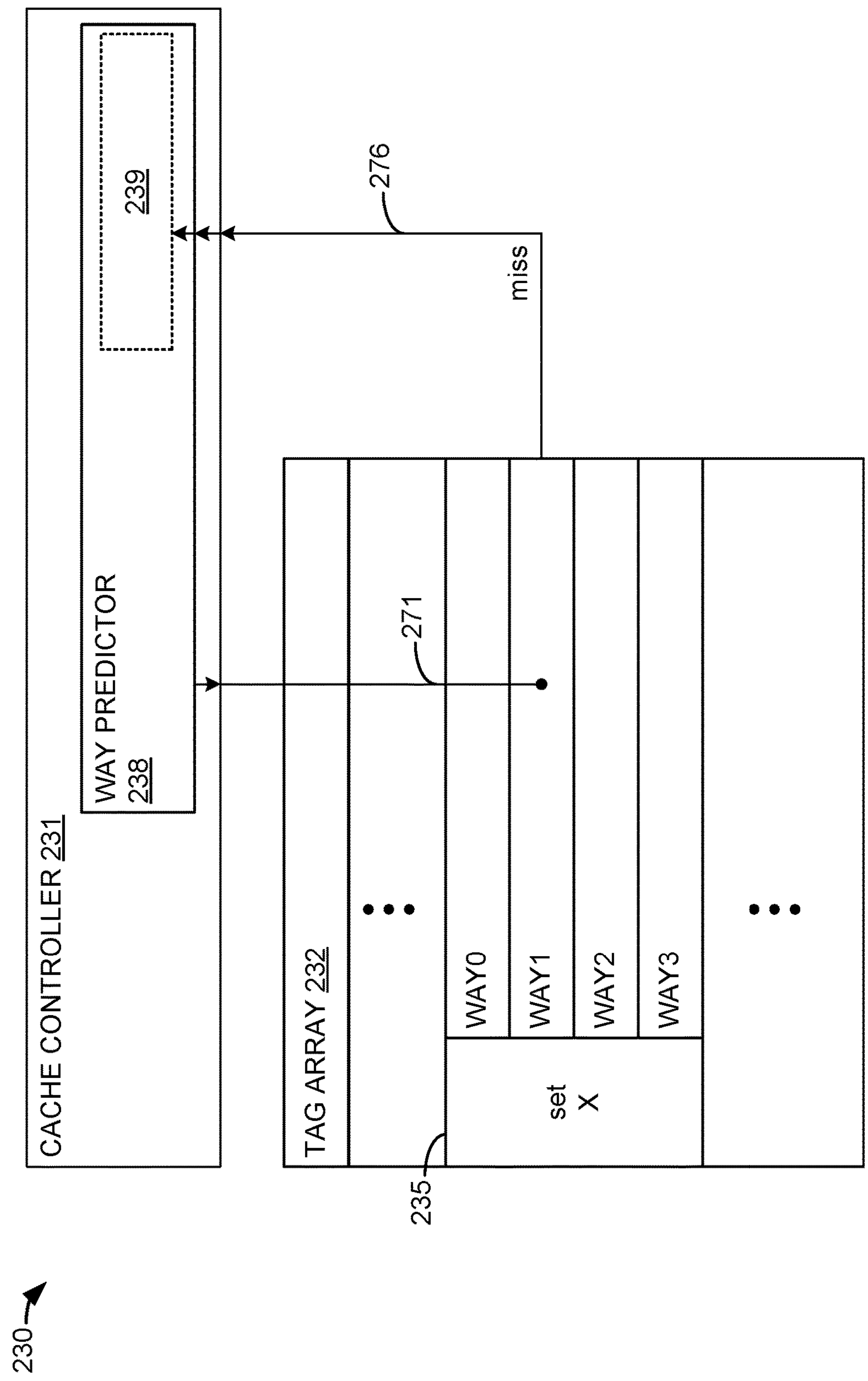

FIG. 2C illustrates a second (after the access of FIG. 2B) serialized access to a second way of set X. In FIG. 2C, way predictor 238 selects, and cache controller 231 activates and reads, only a single way of set X. This is illustrated in FIG. 2C by line 271 from way predictor 238 to way1. The results of this second access to the second way of set X is provided to cache controller 231 and way predictor 238. This is illustrated in FIG. 2C by arrow 276 from way1 to way prediction table 239. Also illustrated in FIG. 2C is that the access to the way1 entry of set X resulted in a 'miss.' This is illustrated in FIG. 2C by the 'miss' label on arrow 276 (which runs from way1 to cache controller 231 and way prediction table 239.) Thus, the determination that the order selected by way predictor 238 resulted in a 'miss' on the second tag selected for lookup can be used to improve the predictions made by way predictor 238.

Figure 2D:
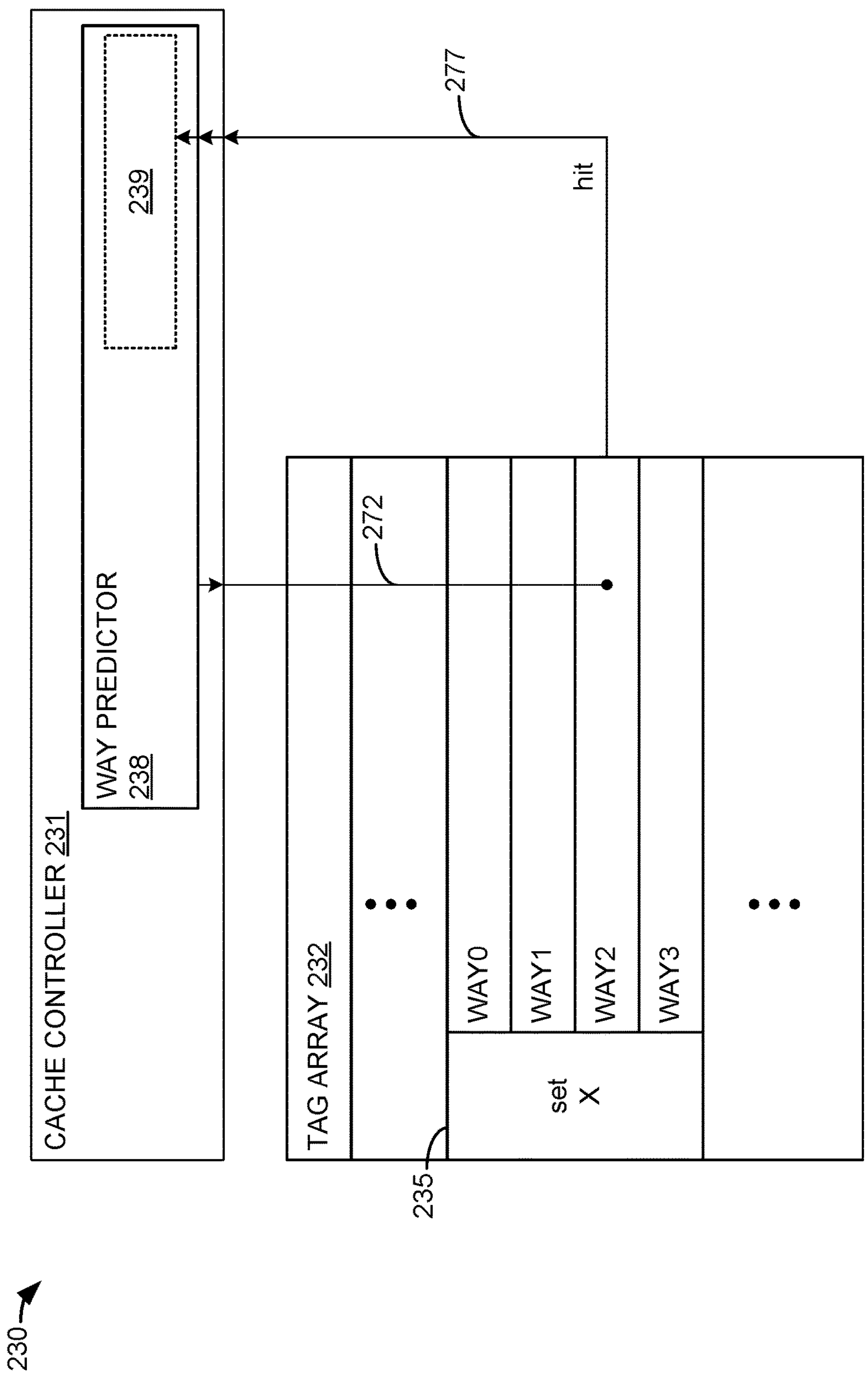

FIG. 2D illustrates a third (after the accesses of FIGS. 2A and 2B) serialized access to a third way of set X. In FIG. 2D, way predictor 238 selects, and cache controller 231 activates and reads, only a single way of set X. This is illustrated in FIG. 2D by line 272 from way predictor 238 to way2. The results of this third access to the third way of set X is provided to cache controller 231 and way predictor 238. This is illustrated in FIG. 2D by arrow 277 from way2 to way prediction table 239. Also illustrated in FIG. 2D is that the access to the way2 entry of set X resulted in a 'hit.' This is illustrated in FIG. 2D by the 'hit' label on arrow 276 (which runs from way2 to cache controller 231 and way prediction table 239.) Thus, the determination that the order selected by way predictor 238 resulted in a 'hit' on way2 can be used to improve the predictions made by way predictor 238. For example, way prediction table 239 may be updated so that the next time set X is accessed to look up a particular address, way predictor 238 will select way2 to be the first way to be accessed (rather than way0 as shown in FIG. 2B.) Since this third serialized access resulted in a hit, cache controller 231 may forego accessing way3. In this manner, at least the power associated with accessing way3 is saved.

Figure 2E:
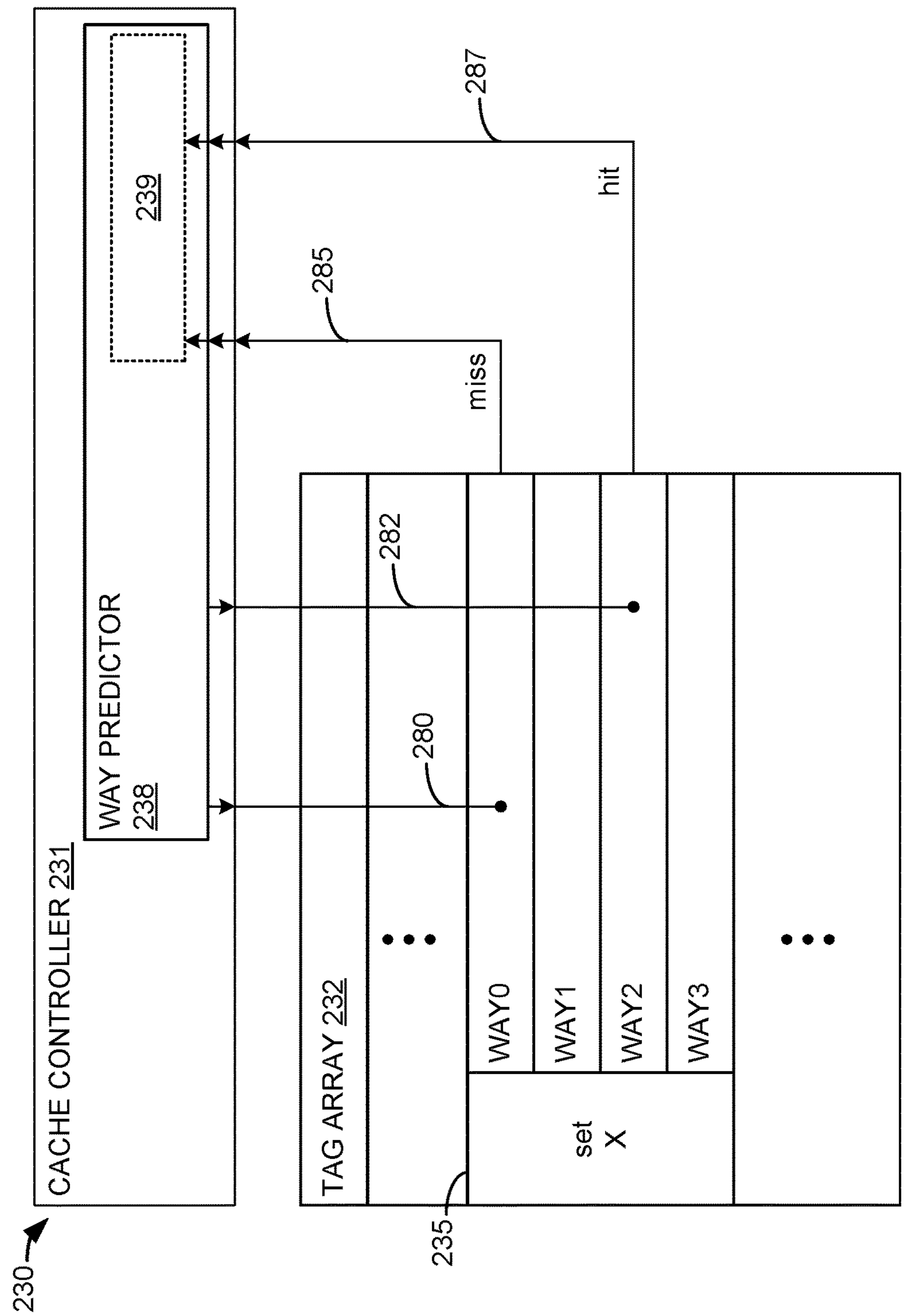

FIG. 2E illustrates serialized access to a multi-way subset of set X. In FIG. 2E, way predictor 238 selects, and cache controller 231 activates and reads, two of the ways (way0 and way2) of set X concurrently. This is illustrated in FIG. 2E by line 280 (from way predictor 238 to way0) and line 282 (from way predictor 238 to way2.) The results of these two parallel accesses to the two ways of set X are provided to cache controller 231 and way prediction table 239. This is illustrated in FIG. 2E by arrow 285 (from way0 to way prediction table 239) and arrow 287 (from way2 to way prediction table 239.) Also illustrated in FIG. 2E is that the access to the way0 entry of set X resulted in a 'miss' but the access to the way2 entry of set X resulted in a 'hit.' This is illustrated in FIG. 2E by the 'miss' label on arrow 285 (which runs from way0 to cache controller 231 and way prediction table 239) and the 'hit' label on arrow 287 (which runs from way2 to cache controller 231 and way prediction table 239.) Since this access to a multi-way subset of set X resulted in a hit, cache controller 231 may forego accessing way1 and way 3. In this manner, the power associated with accessing at least way1 and way3 is saved.

In addition, the determination that the first subset selected by way predictor 238 resulted in a 'hit' on way2 can be used to improve the predictions made by way predictor 238. For example, way prediction table 239 may be updated so that the next time set X is accessed to look up a particular address, way predictor 238 will select way2 as part of the first subset of ways to be accessed.

Figure 3:
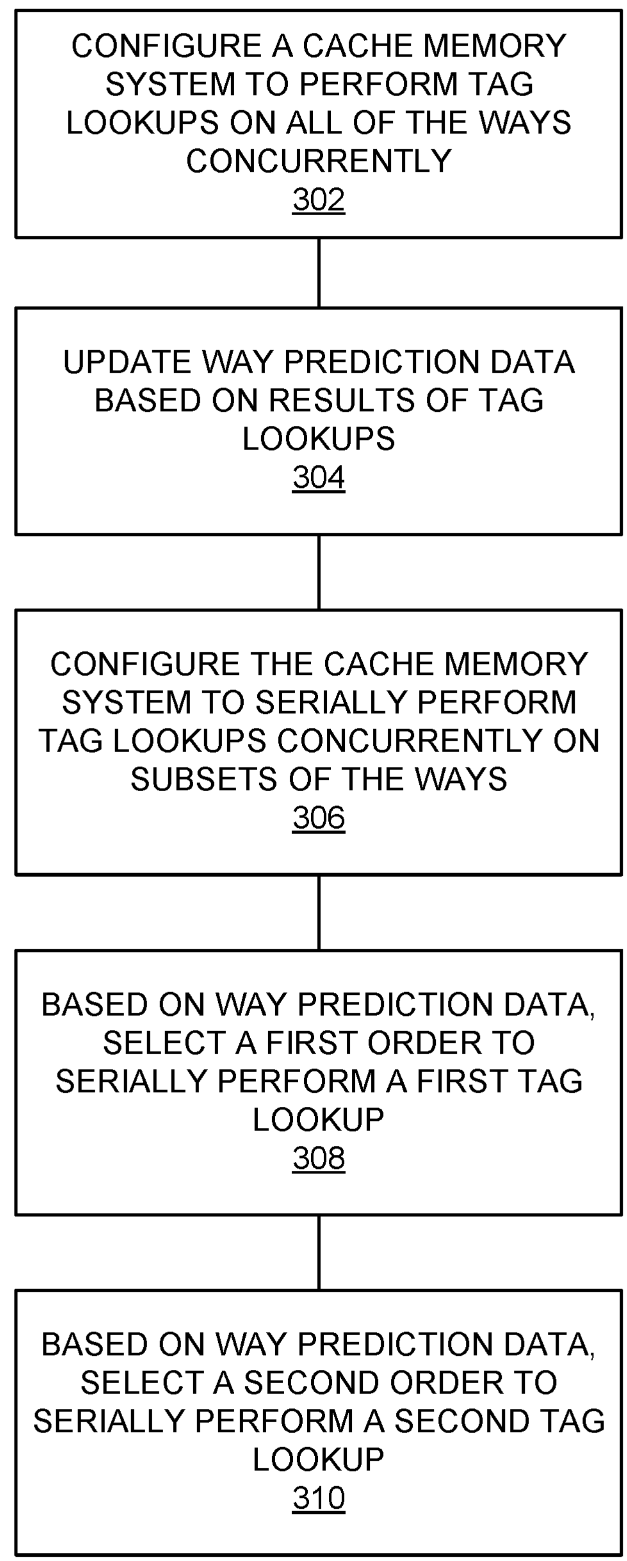
FIG. 3 is a flowchart illustrating a method of operating a cache with multiple tag ways.

FIG. 3 is a flowchart illustrating a method of operating a cache with multiple tag ways. The steps illustrated in FIG. 3 may be performed, for example, by one or more elements of processing system 100, cache 230, and/or their components. A cache memory system is configured to perform tag lookups on all of the ways concurrently (302). For example, cache 130 may be configured to perform tag lookups on all the entries (i.e., way(X,0), way(X,1) way(X,N−1)) of set X 135 concurrently.

Way prediction data is updated based on the results of the tag lookups (304). For example, way predictor 238 may use the 'hit' and/or 'miss' information received as a result of the concurrent tag lookups on all the entries (i.e., way(X,0), way(X,1) way(X,N−1)) of set X 135 to update way prediction table 239.

The cache memory is configured to serially perform tag lookups concurrently on subsets of the ways (306). For example, cache 130 may be configured to perform tag lookups on subsets (e.g., one way, two ways, three ways, etc.) of the entries of set X 135 concurrently with these subsets being accessed in a first order.

Based on way prediction data, a first order is selected to serially perform a first tag lookup (308). For example, way predictor 238, based on the contents of way prediction table 239, may select the members of the subsets and the order the subsets will be searched. For example, cache 130 may first perform tag lookups on way(X,0) and way(X,5) concurrently. If this does not result in a hit, cache 130 may then perform tag lookups on way(X,2) and way(X,3) concurrently. If this does not result in a hit, cache 130 may then perform tag lookups on way(X,4) and way(X,1) concurrently, and so on. The selection of way(X,0) and way(X,5) to be in a first subset together, of way(X,2) and way(X,3) to be in a second subset together, and of way(X,4) and way (X,1) to be in a third subset together may be made by way predictor 238 based on information in way prediction table 239. The selection of the first subset to be searched first, second subset to be searched second, and third subset to be searched third may be made by way predictor 238 based on information in way prediction table 239.

Based on way prediction data, a second order is selected to serially perform a first tag lookup (310). For example, after an update to way prediction table 239 and/or in response to a different access address, way predictor 238 may select different members for the subsets and a different order for the subsets to be searched. For example, cache 130 may first perform tag lookups on way(X,2) and way(X,5) concurrently. If this does not result in a hit, cache 130 may then perform tag lookups on way(X,5) and way(X,3) concurrently. If this does not result in a hit, cache 130 may then perform tag lookups on way(X,4) and way(X,1) concurrently, and so on. The selection of way(X,2) and way(X,5) to be in a first subset together, of way(X,5) and way(X,3) to be in a second subset together, and of way(X,4) and way (X,1) to be in a third subset together may be made by way predictor 238 based on the updated information in way prediction table 239 and/or the access address. The selection of the first subset to be searched first, second subset to be searched second, and third subset to be searched third may be made by way predictor 238 based on information in way prediction table 239 and/or the access address.

Figure 4:
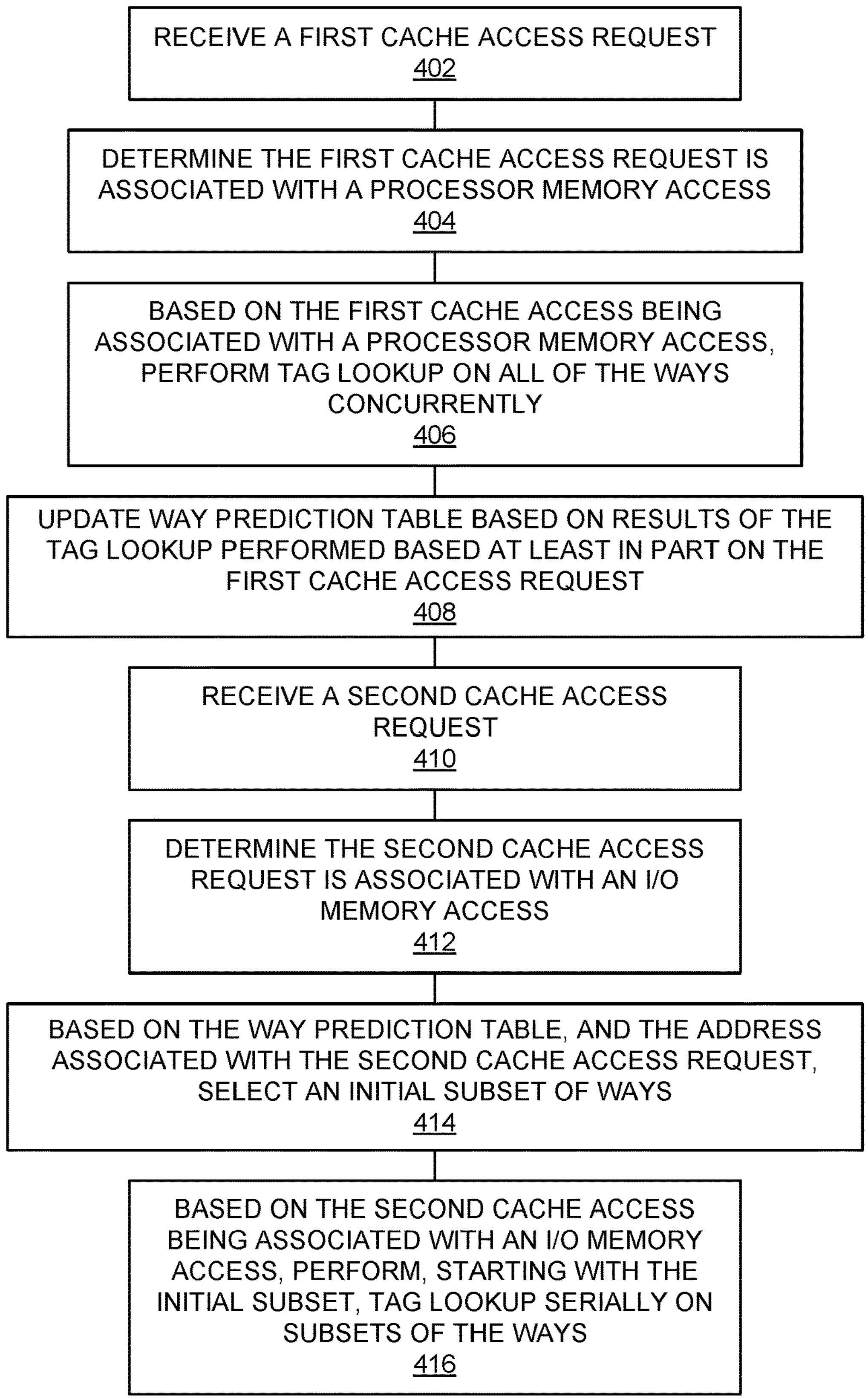
FIG. 4 is a flowchart illustrating a method of operating a way predicted cache.

FIG. 4 is a flowchart illustrating a method of operating a way predicted cache. The steps illustrated in FIG. 4 may be performed, for example, by one or more elements of processing system 100, cache 230, and/or their components. A first cache access request is received (402). For example, cache 130 may receive, from processor 111, a snoop transaction. Processor 111 may have sent this snoop transaction to cache 130 to determine whether cache 130 holds a copy of a particular cache line.

The first cache access request is determined to be associated with a processor memory access (404). For example, cache 130 may determine, based on the source of the snoop transaction, that the transaction is from a processor 111-115 (and/or processor 111, in particular.) In another example, cache 130 may determine, based on the address of the snoop transaction (e.g., processor memory space vs. I/O memory space), that the snoop transaction is associated with a processor transaction.

Based on the first cache access being associated with a processor memory access, a tag lookup is performed on all of the ways concurrently (406). For example, cache 130 may, based on the determination that a snoop transaction is from a processor 111-115, perform a tag lookup on all of the ways of set X 135 concurrently.

Based on results of the tag lookup performed based at least in part on the first cache access request, a way prediction table is updated (408). For example, based on the results of the tag lookup on all of the ways of set X 135, way prediction table 239 may be updated based on the 'hit' and 'miss' results. In particular, way prediction table 239 may be updated to make the selection of ways to be searched first (or earlier) more likely if they 'hit' and less likely if they 'missed.'

A second cache access request is received (410). For example, cache 130 may receive, from I/O 142, a snoop transaction. I/O 142 may have sent this snoop transaction to cache 130 to determine whether cache 130 holds a copy of a particular cache line. I/O 142 may have sent this snoop transaction to cache 130 to cause cache 130 to, for example, invalidate a copy of a particular cache line.

The second cache access request is determined to be associated with an I/O memory access (412). For example, cache 130 may determine, based on the source of the snoop transaction, that the transaction is from I/O 142. In another example, cache 130 may determine, based on the address of the snoop transaction (e.g., processor memory space vs. I/O memory space), that the snoop transaction is associated with an I/O memory space transaction.

Based on the way prediction table, and the address associated with the second cache access request, an initial subset of ways is selected (414). For example, based on the address associated with cache request, and index into way prediction table 239 may be generated. This index can be used to retrieve way prediction information from way prediction table 239. The way prediction information may be used to select which way(s) are to be searched first (and in what order.) For example, based on the determination that a snoop transaction is from I/O 142, way prediction may, based on the way prediction information, elect to first perform a tag lookup on way(X,3) of set X 135, then to perform a tag lookup on way(X,1) of set X 135, then to perform a tag lookup on way(X,2) of set X 135, and so on.

Based on the second cache access being associated with an I/O memory access, a tag lookup is performed serially on subsets of the ways concurrently (416). For example, cache 130 may, based on the selections made by way predictor 238, first perform a tag lookup on way(X,3) of set X 135, then perform a tag lookup on way(X,1) of set X 135, then perform a tag lookup on way(X,2) of set X 135, and so on until either all of the tag ways have been checked or a hit is found.

Figure 5:
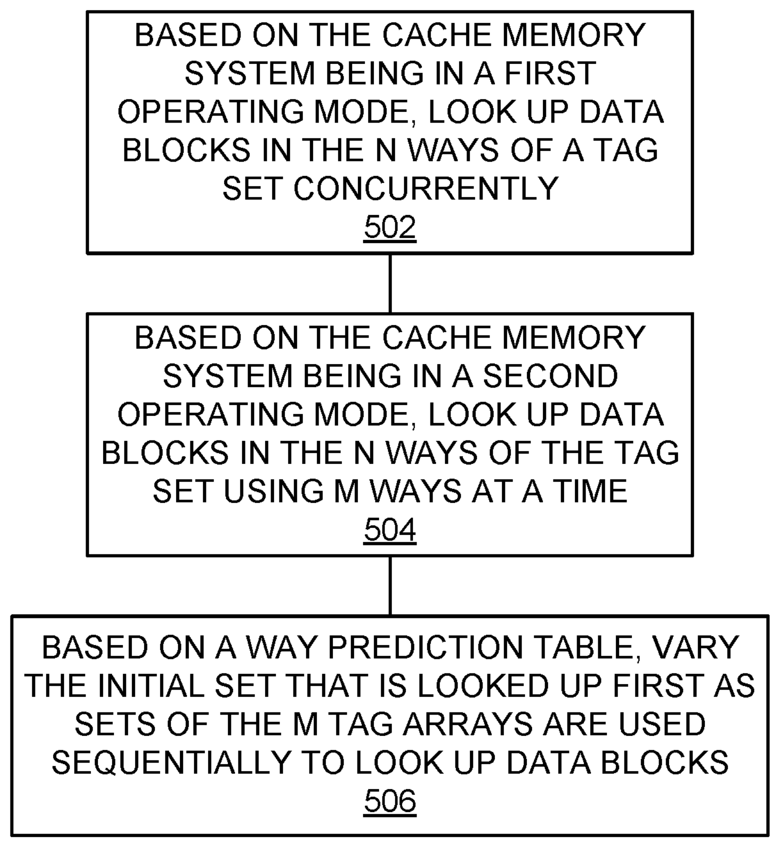
FIG. 5 is a flowchart illustrating a method of configuring cache tag accesses.

FIG. 5 is a flowchart illustrating a method of configuring cache tag accesses. The steps illustrated in FIG. 5 may be performed, for example, by one or more elements of processing system 100, cache 230, and/or their components. Based on the cache memory system being in a first operating mode, data blocks are looked up in the N ways of a tag set concurrently (502). For example, based on cache 130 being in a high-power operating mode, cache 130 may look up cache lines in set X 135 by accessing way(X,0) to way(X, N−1) concurrently.

Based on the cache memory being is a second operating mode, data blocks are looked up in the N ways of the tag set using M ways at a time (504). For example, based on cache 130 being in a lower-power operating mode, cache 130 may look up cache lines in set X 135 by first accessing way(X,0), then accessing way(X,1), then accessing way (X,2), and so on until all N ways have been accessed or a hit has been detected. In another example, based on cache 130 being in a lower-power operating mode, cache 130 may look up cache lines in set X 135 by first accessing way(X,0) and way(X,N−1) concurrently, then accessing way(X,1), then accessing way (X,N−2) concurrently, and so on until all N ways have been accessed or a hit has been detected.

Based on a way prediction table, the initial set of M tag ways that is used to look up data blocks as sets of M tag arrays are used sequentially to look up data blocks is varied (506). For example, the first time cache 130 looks up a cache line in set X 135, cache 130 may, based on the data in way prediction table 239, start with a first access to way(X,0), then an access way(X,1), then an access way (X,2), and so on until all N ways have been accessed or a hit has been detected. The second time cache 130 looks up a cache line in set X 135, cache 130 may, based on the data in way prediction table 239, start with a first access to way(X,1), then an access way(X,2), then an access way (X,3), and then after way(X,N−1) is accessed, cache 130 may wrap-around and access way(X,0). Thus, although the serial order of these access has changed, either all N ways will be accessed and checked for a hit, or a hit will have been detected.

In another example, based on the data in way prediction table 239, the first time cache 130 looks up a cache line in set X 135, cache 130 may start with tag lookups on way(X, N−1) and way(X,N−2) concurrently. If this does not result in a hit, cache 130 may then perform tag lookups on way(X, N−3) and way(X,N−4) concurrently. If this does not result in a hit, cache 130 may perform tag lookups on way(X,N−5) and way(X,N−6) concurrently, and so on. The second time cache 130 looks up a cache line in set X 135, cache 130 may, based on the data in way prediction table 239, start with tag lookups on way(X,1) and way(X,2) concurrently. If this does not result in a hit, cache 130 may then perform tag lookups on way(X,3) and way(X,4) concurrently. If this does not result in a hit, cache 130 may perform tag lookups on way(X,5) and way(X,6) concurrently, and so on.

Figure 6:
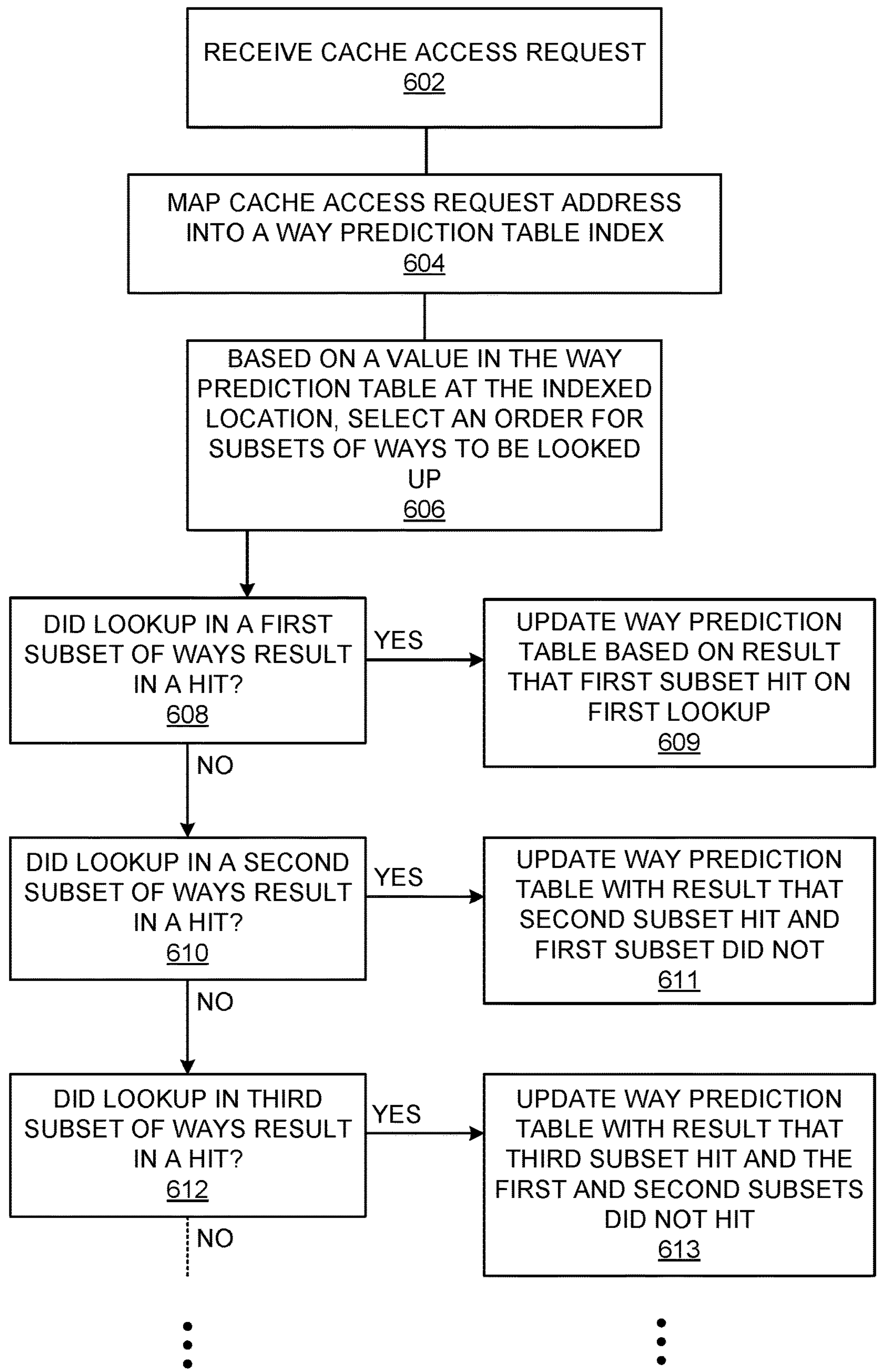
FIG. 6 is an illustration of a method of updating a way prediction table.

FIG. 6 is an illustration of a method of updating a way prediction table. The steps illustrated in FIG. 6 may be performed, for example, by one or more elements of processing system 100, cache 230, and/or their components. A cache access request is received (602). For example, cache 130 may receive, from processor 111, a snoop transaction. Processor 111 may have sent this snoop transaction to cache 130 to determine whether cache 130 holds a copy of a particular cache line.

The cache access request address is mapped into a way prediction table index (604). For example, a field (e.g., Y number of bits, where Y is an integer) may be extracted from the access address and used as an index into way prediction table 139. In another example, the access address may be processed through an algorithm or function (e.g., hashing function) to produce a Y-bit number that can be used as the index into way predication table 139.

Based on a value in the way prediction table at the indexed location, an order for subsets of ways to be looked up is selected (606). For example, way prediction table 139 may, for each index (i.e., entry), store an indicator of the most recent way that hit. Way predictor 138 may use this value to determine an order to serially search the corresponding ways. For example, way predictor 138 may select the most recent way as the first way to search, and then proceed to search the ways in an ascending order (with wraparound.) In another example, way predictor 138 may select the most recent way, minus one, as the first way to search, and then proceed to search the ways in a descending (with wraparound) order. This example would result in the most recent way from way prediction table 139 being the last way searched.

It is determined whether the lookup in the first subset of ways resulted in a hit (608). If the lookup in the first subset of ways resulted in a hit, flow proceeds to box 609. If the lookup in the first subset of ways did not result in a hit, flow proceeds to box 610. If the lookup in the first subset of ways resulted in a hit, the way prediction table is updated based on the result that the first subset hit on the first lookup (609). For example, when way prediction table 139 stores the 'most recent to hit' way number, and way predictor selected the way identified in way prediction table as the first set of ways to search, way prediction table 139 may be updated to reinforce that selection (e.g., by updating a weighting factor or counter).

If the lookup in the first subset of ways did not result in a hit, it is determined whether the lookup in a second subset of ways resulted in a hit (610). If the lookup in the second subset of ways resulted in a hit, flow proceeds to box 611. If the lookup in the first subset of ways did not result in a hit, flow proceeds to box 612. If the lookup in the second subset of ways resulted in a hit, the way prediction table is updated based on the result that the second subset hit on the second lookup (609). For example, when way prediction table 139 stores the 'most recent to hit' way number, and way predictor selected the way identified in way prediction table as the first way to search, way prediction table 139 may be updated to change that selection to the second subset of ways (e.g., by changing the 'most recent to hit' value in way prediction table to the value corresponding to the second subset of ways).

If the lookup in the second subset of ways did not result in a hit, it is determined whether the lookup in a third subset of ways resulted in a hit (612). If the lookup in the second subset of ways resulted in a hit, flow proceeds to box 613. If the lookup in the first subset of ways did not result in a hit, flow proceeds to search additional sets of ways (and update way prediction table 139 based on any misses and/or hits) until all of the ways have been searched. If the lookup in the third subset of ways resulted in a hit, the way prediction table is updated based on the result that the second subset hit on the second lookup (613). For example, when way prediction table 139 stores the 'most recent to hit' way number, and way predictor selected the way identified in way prediction table as the first way to search, way prediction table 139 may be updated to change that selection to the third subset of ways (e.g., by changing the 'most recent to hit' value in way prediction table to the value corresponding to the third subset of ways).

It should be understood that other ways of creating, updating, and using way prediction table 139 and way prediction table 239 are possible. For example, a respective entry in way prediction table 139 and/or way prediction table 239 may be updated based on a number of iterations of M ways were serially looked up in order to find a tag hit.

In other words, an entry (at each index) for each way may be maintained in way prediction table 139 and/or way prediction table 239. Each of these entries may hold a number corresponding to the average number of ways searched before a hit is encountered when the way search elected that way as the initial way to search. Thus, if for a given index into way prediction table 139 it takes, on average, the searching of P number of ways before a hit when way Q is selected to be searched first, and the next search where way Q is selected as the first to search takes the searching of P+3 ways, then the entry corresponding to Q may need to be updated to a value higher than P.

In another example, the way prediction table entries may store indicators that help indicate the direction or other formula for the order of the search. Thus, for example, if the entries for a given index store the average number of ways searched before a hit when the corresponding way is searched first, the entries for the adjacent ways may give an indicator that can be used to set the direction of the search. In other words, for a given index, selecting way0 has averaged 3 ways to search before a hit; way1 has averaged 3 ways to search before a hit; way2 has averaged 2 ways to search before a hit; and, way3 has averaged 1 way to search before a hit, way predictor 138 may elect to search way 3 first (because it has the lowest average number of 'misses' before a hit.) In addition, way predictor 138 may elect to search these ways in descending order (e.g., way3, way2, way1, then way0) because way2 has a lower average number of ways to search than way0.

The methods, systems and devices described herein may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of processing system 100, cache 230, and their components. These software descriptions may be: behavioral, register transfer, logic component, transistor, and layout geometry-level descriptions.

Data formats in which such descriptions may be implemented are stored on a non-transitory computer readable medium include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Physical files may be implemented on non-transitory machine-readable media such as: 4 mm magnetic tape, 8 mm magnetic tape, 3½-inch floppy media, CDs, DVDs, hard disk drives, solid-state disk drives, solid-state memory, flash drives, and so on.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), multi-core processors, graphics processing units (GPUs), etc.

Figure 7:
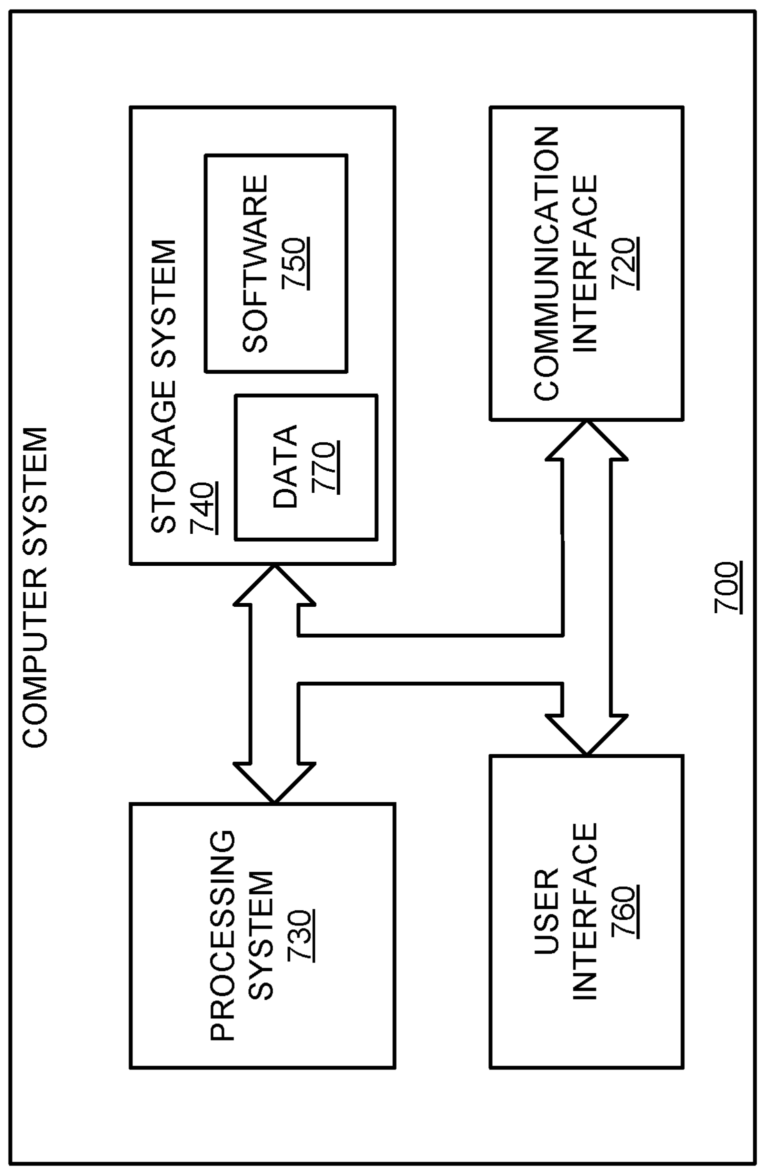
FIG. 7 is a block diagram illustrating a computer system.

FIG. 7 illustrates a block diagram of an example computer system. In an embodiment, computer system 700 and/or its components include circuits, software, and/or data that implement, or are used to implement, the methods, systems and/or devices illustrated in the Figures, the corresponding discussions of the Figures, and/or are otherwise taught herein.

Computer system 700 includes communication interface 720, processing system 730, storage system 740, and user interface 760. Processing system 730 is operatively coupled to storage system 740. Storage system 740 stores software 750 and data 770. Processing system 730 is operatively coupled to communication interface 720 and user interface 760. Processing system 730 may be an example of one or more of processing system 100, processing system 400, and/or their components.

Computer system 700 may comprise a programmed general-purpose computer. Computer system 700 may include a microprocessor. Computer system 700 may comprise programmable or special purpose circuitry. Computer system 700 may be distributed among multiple devices, processors, storage, and/or interfaces that together comprise elements 720-770.

Communication interface 720 may comprise a network interface, modem, port, bus, link, transceiver, or other communication device. Communication interface 720 may be distributed among multiple communication devices. Processing system 730 may comprise a microprocessor, microcontroller, logic circuit, or other processing device. Processing system 730 may be distributed among multiple processing devices. User interface 760 may comprise a keyboard, mouse, voice recognition interface, microphone and speakers, graphical display, touch screen, or other type of user interface device. User interface 760 may be distributed among multiple interface devices. Storage system 740 may comprise a disk, tape, integrated circuit, RAM, ROM, EEPROM, flash memory, network storage, server, or other memory function. Storage system 740 may include computer readable medium. Storage system 740 may be distributed among multiple memory devices.

Processing system 730 retrieves and executes software 750 from storage system 740. Processing system 730 may retrieve and store data 770. Processing system 730 may also retrieve and store data via communication interface 720. Processing system 750 may create or modify software 750 or data 770 to achieve a tangible result. Processing system may control communication interface 720 or user interface 760 to achieve a tangible result. Processing system 730 may retrieve and execute remotely stored software via communication interface 720.

Software 750 and remotely stored software may comprise an operating system, utilities, drivers, networking software, and other software typically executed by a computer system. Software 750 may comprise an application program, applet, firmware, or other form of machine-readable processing instructions typically executed by a computer system. When executed by processing system 730, software 750 or remotely stored software may direct computer system 700 to operate as described herein.

Implementations discussed herein include, but are not limited to, the following examples:

Example 1

An apparatus for processing data, comprising: an N-way set associative cache memory comprising a storage array and N tag ways, the storage array organized into a plurality of cache lines, the tag ways providing an N-way index of storage array locations associated with data blocks stored in the storage array; a cache controller coupled to the cache memory to respond to cache access requests for data blocks, the cache controller configurable to perform cache lookups using N-ways in parallel, the cache controller also being configurable to perform cache lookups on the N-ways by serially using sets of M ways in parallel, where M<N; and, a way predictor that selects a respective set of M ways as the initial M ways to be looked up based at least in part on a cache access request while the cache controller is configured to perform cache lookups serially.

Example 2

The apparatus of example 1, wherein M=1.

Example 3

The apparatus of example 1, wherein if a cache lookup for a requested data block that was performed on a set of M ways in parallel indicates the requested data block is present in the storage array, and there are remaining ways that have not been used to lookup the requested data block, the remaining ways are not used to lookup the requested data block.

Example 4

The apparatus of example 1, wherein the sets of M ways are used, based on a first indicator from the way predictor, in a first serial order for a first cache access request and, based on a second indicator from the way predictor, a second serial order for a second cache access request.

Example 5

The apparatus of example 1, wherein the way predictor includes a way prediction table having a plurality of entries corresponding to the indexes of the storage array locations.

Example 6

The apparatus of example 5, wherein a respective entry in the way prediction table is updated based on whether the initial M ways to be looked up resulted in a tag hit.

Example 7

The apparatus of example 5, wherein a respective entry in the way prediction table is updated based on a number of iterations of M ways were serially looked up in order to find a tag hit.

Example 8

A method of operating a cache memory system having a plurality of ways, comprising: configuring the cache memory system to perform tag lookups on all of the plurality of ways concurrently; configuring the cache memory system to serially perform tag lookups concurrently on subsets of the plurality of cache ways; selecting, based on a history of tag lookups and based on an address of a cache access request, initial subsets of the plurality of cache ways to be looked up.

Example 9

The method of example 8, wherein the subsets consist of one cache way of the plurality of cache ways.

Example 10

The method of example 8, wherein the serially performed tag lookups are stopped based at least in part on a respective tag lookup indicating a corresponding data block is in the cache memory system.

Example 11

The method of example 10, wherein the serially performed tag lookups proceed until a tag lookup has been performed on all of the plurality of ways.

Example 12

The method of example 8, further comprising: selecting, based on the history of tag lookups and based on the address of a first cache access request, a first order that the plurality of cache ways are to be looked up.

Example 13

The method of example 12, further comprising: selecting, based on the history of tag lookups and based on the address of a second cache access request, a second order that the plurality of cache ways are to be looked up, the second order being different from the first order.

Example 14

The method of example 13, wherein the first order corresponds to an increasing series and the second order corresponds to a decreasing series.

Example 15

The method of example 8, wherein the history of tag lookups is based on a way prediction table having a plurality of entries corresponding to the indexes of the storage array location.

Example 16

The method of example 15, further comprising: updating a respective entry in the way prediction table based on whether a respective initial subset resulted in a tag hit.

Example 17

A method of operating an N-way set associative cache memory system having N tag ways, comprising: based on the cache memory system being in a first operating mode, looking up data blocks in the N tag ways concurrently; and, based on the cache memory system being in a second operating mode, sequentially looking up data blocks in subsets of the N tag ways using M tag ways at a time, where $M<N$, an initial set of the M tag ways to be sequentially looked up first being selected based on a way prediction table.

Example 18

The method of example 17, wherein $M>1$.

Example 19

The method of example 17, further comprising: varying a sequential order that sets of the M tag ways are used to look up data blocks based on the way prediction table.

Example 20

The method of example 19, the way prediction table is updated based on based on a number of serially performed tag lookups that were required in order to find a tag hit.

The foregoing descriptions of the disclosed embodiments have been presented for purposes of illustration and description. They are not intended to be exhaustive or to limit the scope of the claimed subject matter to the precise form(s) disclosed, and other modifications and variations may be possible in light of the above teachings. The embodiments were chosen and described in order to best explain the principles of the disclosed embodiments and their practical application to thereby enable others skilled in the art to best utilize the various embodiments and various modifications as are suited to the particular use contemplated. It is intended that the appended claims be construed to include other alternative embodiments except insofar as limited by the prior art.

What is claimed is:

1. An apparatus for processing data, comprising:

an N-way set associative cache memory comprising a storage array and N tag ways, the storage array organized into a plurality of cache lines, the tag ways providing an N-way index of storage array locations associated with data blocks stored in the storage array;

a cache controller coupled to the cache memory to respond to cache access requests for data blocks, the cache controller configurable to perform cache lookups using N-ways in parallel in response to detecting that a first condition has been met, the first condition including a first, higher power state, the cache controller also being configurable to perform cache lookups on the N-ways by serially using sets of M ways in parallel in response to detecting a change in conditions from the first condition to a second condition, the second condition including a second, lower power state, where M<N; and, a way predictor that selects a respective set of M ways as the initial M ways to be looked up based at least in part on a cache access request while the cache controller is configured to perform cache lookups serially.

2. The apparatus of claim 1, wherein M=1.

3. The apparatus of claim 1, wherein if a cache lookup for a requested data block that was performed on a set of M ways in parallel indicates the requested data block is present in the storage array, and there are remaining ways that have not been used to lookup the requested data block, the remaining ways are not used to lookup the requested data block.

4. The apparatus of claim 1, wherein the sets of M ways are used, based on a first indicator from the way predictor, in a first serial order for a first cache access request and, based on a second indicator from the way predictor, a second serial order for a second cache access request.

5. The apparatus of claim 1, wherein the way predictor includes a way prediction table having a plurality of entries corresponding to the indexes of the storage array locations.

6. The apparatus of claim 5, wherein a respective entry in the way prediction table is updated based on whether the initial M ways to be looked up resulted in a tag hit.

7. The apparatus of claim 5, wherein a respective entry in the way prediction table is updated based on a number of iterations of M ways were serially looked up in order to find a tag hit.

8. A method of operating a cache memory system having a plurality of ways, comprising:

configuring the cache memory system to perform tag lookups on all of the plurality of ways concurrently in response to detecting that a first condition has been met, the first condition including a first, higher power state;

configuring the cache memory system to serially perform tag lookups concurrently on subsets of the plurality of cache ways in response to detecting that a second condition has been met, but not the first condition, the second condition including a second, lower power state; and, selecting, based on a history of tag lookups and based on an address of a cache access request, initial subsets of the plurality of cache ways to be looked up.

9. The method of claim 8, wherein the subsets consist of one cache way of the plurality of cache ways.

10. The method of claim 8, wherein the serially performed tag lookups are stopped based at least in part on a respective tag lookup indicating a corresponding data block is in the cache memory system.

11. The method of claim 10, wherein the serially performed tag lookups proceed until a tag lookup has been performed on all of the plurality of ways.

12. The method of claim 8, further comprising:

selecting, based on the history of tag lookups and based on the address of a first cache access request, a first order that the plurality of cache ways are to be looked up.

13. The method of claim 12, further comprising:

selecting, based on the history of tag lookups and based on the address of a second cache access request, a second order that the plurality of cache ways are to be looked up, the second order being different from the first order.

14. The method of claim 13, wherein the first order corresponds to an increasing series and the second order corresponds to a decreasing series.

15. The method of claim 8, wherein the history of tag lookups is based on a way prediction table having a plurality of entries corresponding to the indexes of the storage array location.

16. The method of claim 15, further comprising:

updating a respective entry in the way prediction table based on whether a respective initial subset resulted in a tag hit.

17. A method of operating an N-way set associative cache memory system having N tag ways, comprising:

based on the cache memory system being in a first operating mode including a first, higher power state, looking up data blocks in the N tag ways concurrently;

detecting a change in operating mode to a second operating mode including a second, lower power state; and, based on detecting that the cache memory system is in the second operating mode including the second, lower power state, sequentially looking up data blocks in subsets of the N tag ways using M tag ways at a time, where M<N, an initial set of the M tag ways to be sequentially looked up first being selected based on a way prediction table.

18. The method of claim 17, wherein M>1.

19. The method of claim 17, further comprising:

varying a sequential order that sets of the M tag ways are used to look up data blocks based on the way prediction table.

20. The method of claim 19, the way prediction table is updated based on based on a number of serially performed tag lookups that were required in order to find a tag hit.

21. An apparatus for processing data, comprising:

an N-way set associative cache memory comprising a storage array and N tag ways, the storage array organized into a plurality of cache lines, the tag ways providing an N-way index of storage array locations associated with data blocks stored in the storage array; and a cache controller coupled to the cache memory to respond to cache access requests for data blocks, the cache controller configured to:

detect a power state of the cache memory;

in response to detecting a first, higher power state, performing cache lookups using N-ways in parallel; and in response to detecting a second, lower power state, performing cache lookups on the N-ways by serially using sets of M ways in parallel, where M<N.

22. The apparatus of claim 21, further comprising:

a way predictor configured to select a respective set of M ways as the initial M ways to be looked up based at least in part on a cache access request while the cache controller is configured to perform cache lookups serially.

23. The apparatus of claim 21, wherein the cache controller is further configured to:

in response to detecting a third, balanced power state, performing a combination of parallel cache lookups and serial cache lookups.

* * * * *